US008937478B2

(12) United States Patent
Shimizu et al.

(10) Patent No.: US 8,937,478 B2
(45) Date of Patent: Jan. 20, 2015

(54) ELECTROSTATIC OCCUPANT DETECTION SYSTEM

(75) Inventors: Ryo Shimizu, Kariya (JP); Craig M. Aykroyd, Maricopa, AZ (US); John M. Pigott, Phoenix, AZ (US)

(73) Assignees: Denso Corporation, Kariya (JP); Freescale Semiconductor, Inc., Austin, TX (US)

( * ) Notice: Subject to any disclaimer, the term of this patent is extended or adjusted under 35 U.S.C. 154(b) by 406 days.

(21) Appl. No.: 13/068,335

(22) Filed: May 9, 2011

(65) Prior Publication Data

US 2011/0279126 A1    Nov. 17, 2011

(30) Foreign Application Priority Data

May 11, 2010   (JP) ................................ 2010-109576
Mar. 16, 2011  (JP) ................................ 2011-58204

(51) Int. Cl.
*G01N 27/60*     (2006.01)
(52) U.S. Cl.
USPC ......................................... 324/452; 324/692
(58) Field of Classification Search
USPC ........................................................ 324/452
See application file for complete search history.

(56) References Cited

U.S. PATENT DOCUMENTS

| 6,014,602 A * | 1/2000 | Kithil et al. ..................... 701/45 |
| 6,517,106 B1 * | 2/2003 | Stanley et al. ................. 280/735 |
| 6,552,550 B2 * | 4/2003 | Karray et al. ................. 324/662 |
| 6,556,137 B1 | 4/2003 | Oka et al. |
| 6,559,555 B1 * | 5/2003 | Saitou et al. ................. 307/10.1 |
| 6,820,897 B2 * | 11/2004 | Breed et al. ................... 280/735 |
| 6,825,765 B2 * | 11/2004 | Stanley et al. ................ 340/561 |
| 7,098,674 B2 * | 8/2006 | Stanley et al. ................ 324/662 |
| 2008/0093925 A1 | 4/2008 | Kobayashi |
| 2008/0100425 A1 | 5/2008 | Kiribayashi |
| 2009/0164070 A1 * | 6/2009 | Yamanaka et al. .............. 701/45 |
| 2010/0102833 A1 | 4/2010 | Uno et al. |

FOREIGN PATENT DOCUMENTS

| JP | 11-271463 | 10/1999 |
| JP | 2009-150783 | 7/2009 |

OTHER PUBLICATIONS

Oka, Yoshitake, JP 11-271463 Machine Translation, JPO, p. 1-20.*
Extended EPO Search Report dated Jul. 25, 2012 in corresponding European Application No. 11164477.9.

* cited by examiner

*Primary Examiner* — Thomas F Valone
(74) *Attorney, Agent, or Firm* — Harness, Dickey & Pierce, PLC

(57) ABSTRACT

An electrostatic occupant detection system includes an electrostatic sensor and an electronic control unit. The electronic control unit is switchable between an occupant determination state in which the electronic control unit outputs a sine wave having a constant amplitude and a diagnosis state in which the electronic control unit maintains a voltage of the electrostatic sensor at a constant level. The electronic control unit gradually changes at least one of an amplitude and a frequency of the sine wave either when the electronic control unit switches from the occupant determination state to the diagnosis state and/or when the electronic control unit switches from the diagnosis state to the occupant determination state.

10 Claims, 18 Drawing Sheets

FIG. 4B REAL TERM R SAMPLING 
FIG. 4C IMAGINARY TERM C SAMPLING 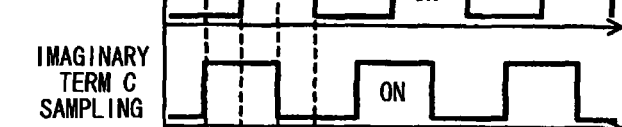
FIG. 4D REAL TERM R CURRENT →VOLTAGE 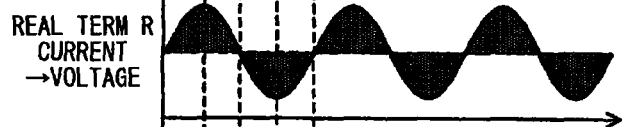
FIG. 4E IMAGINARY TERM C CURRENT →VOLTAGE 
FIG. 5
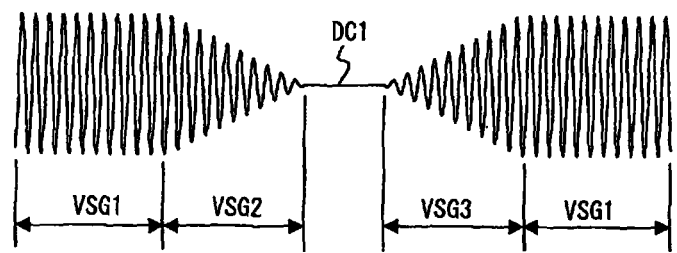

ELECTROSTATIC OCCUPANT DETECTION SYSTEM

CROSS REFERENCE TO RELATED APPLICATIONS

The present application is based on and claims priority to Japanese Patent Applications No. 2010-109576 filed on May 11, 2010, and No. 2011-058204 filed on Mar. 16, 2011, the contents of which are incorporated in their entirety herein by reference.

BACKGROUND OF THE INVENTION

1. Field of the Invention

The present invention relates generally to automobiles and other vehicles, and, more particularly, to an electrostatic occupant detection system.

2. Description of the Related Art

JP-A-11-271463 discloses an electrostatic occupant detection system that includes a mat-shaped electrostatic sensor and an occupant detection electronic control unit (ECU). The electrostatic sensor is supplied with a sine wave from the occupant detection ECU and generates an electric field between a main electrode disposed in a vehicle seat and a vehicle body. The electrostatic sensor outputs an electrical current or a voltage to the occupant detection ECU in accordance with a change in the electric field, and the occupant detection ECU determines the presence of an occupant based on the electrical current or the voltage. When the electrostatic occupant detection system performs a self diagnosis, in general, the occupant detection ECU stops supplying the sine wave to the electrostatic sensor and switches to a predetermined direct current (DC) voltage or the ground level only at an initial check during vehicle start-up.

The above-described occupant detection ECU supplies only the sine wave to the electrostatic sensor during the normal operation. It is preferred to correct variation in a detected capacitance of the electrostatic sensor based on the diagnosis of the electrostatic occupant detection system and a change in an environmental temperature even during the normal operation. In such a case, the sine wave supplied to the electrostatic sensor is stopped once and is switched to the predetermined DC voltage or the ground level. If the sine wave is rapidly switched to the DC voltage or the ground level, noise may be generated, the noise may adversely affect other electronic devices including a radio, and radio noise may be output.

SUMMARY OF THE INVENTION

In view of the foregoing problems, it is an object of the present invention to provide an electrostatic occupant detection system that can reduce noise having frequencies other than a sine wave frequency when a sine wave supplied from an electronic control unit to an electrostatic sensor is changed to a predetermined DC voltage or a ground level.

An electrostatic occupant detection system includes an electrostatic sensor and an electronic control unit. The electrostatic sensor includes an electrode disposed in a vehicle seat. The electrostatic sensor outputs an electrical current or a voltage as an output value in accordance with an intensity of an electric field or a change in an electric filed generated by the electrode. The electronic control unit outputs a sine wave for generating the electric field and determines the presence of an occupant based on the output value. The electronic control unit is switchable between an occupant determination state where the electronic control unit outputs a sine wave having a constant amplitude and a diagnosis state where the electronic control unit maintains a voltage of the electrostatic sensor at a constant level. The electronic control unit gradually changes at least one of an amplitude and a frequency of the sine wave in at least one of a case where the electronic control unit switches from the occupant determination state to the diagnosis state and a case where the electronic control unit switches from the diagnosis state to the occupant determination state.

In the electrostatic occupant detection system, the electronic control unit gradually changes at least one of the amplitude or the frequency of the sine wave in at least one of the case where the electronic control unit switches from the occupant determination state to the diagnosis state and the case where the electronic control unit switches from the diagnosis state to the occupant determination state. Thus, the electrostatic occupant detection system can reduce noise having frequencies other the frequency of the sine wave and can restrict an adverse effect of noise on other electronic devices including a radio.

BRIEF DESCRIPTION OF THE DRAWINGS

Additional objects and advantages of the present invention will be more readily apparent from the following detailed description of preferred embodiments when taken together with the accompanying drawings. In the drawings:

FIG. 4B is a waveform diagram showing a signal for sampling a real term R;

FIG. 4C is a waveform diagram showing a signal for sampling an imaginary term C;

FIG. 4D is a waveform diagram showing an output signal at a time when a potential difference generated at a current detection resistor is sampled based on the signal shown in FIG. 4B;

FIG. 4E is a diagram showing an output signal at a time when a potential difference generated at the current detection resistor is sampled based on the signal shown in FIG. 4C;

FIG. 5 is a waveform diagram showing a signal output from an occupant detection ECU in the electrostatic occupant detection system according to the first embodiment;

DETAILED DESCRIPTION OF THE PREFERRED EMBODIMENTS

First Embodiment

Figure 1:
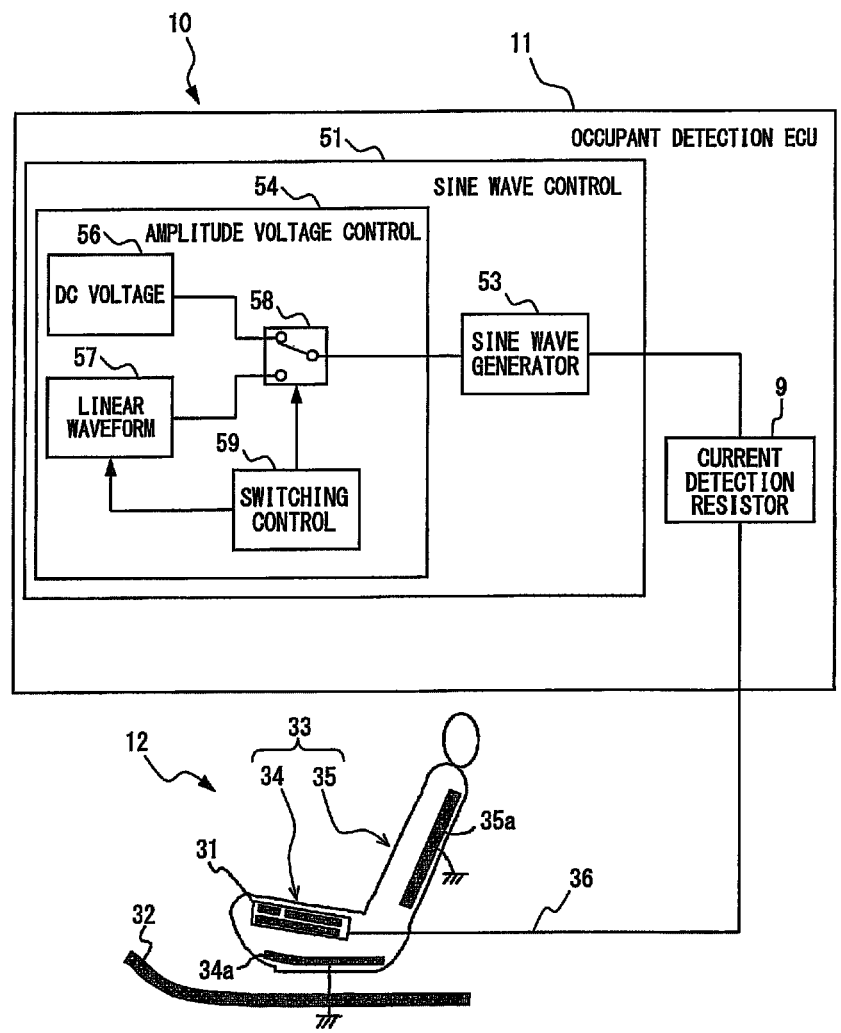
FIG. 1 is a block diagram showing an electrostatic occupant detection system according to a first embodiment of the present invention.

An electrostatic occupant detection system 10 according to a first embodiment of the present invention will be described with reference to FIG. 1. The electrostatic occupant detection system 10 includes an occupant detection ECU 11 and an electrostatic sensor apparatus 12.

The electrostatic sensor apparatus 12 is disposed in a vehicle seat 33. The vehicle seat 33 includes a seat cushion 34 on which an occupant sits and a seat back 35 against which an occupant leans. In a bottom portion of the seat cushion 34, a seat-cushion frame 34a is disposed. In the seat back 35, a seat-back frame 35a is disposed. The seat-cushion frame 34a and the seat-back frame 35a are electrically coupled with a vehicle body (vehicle ground) 32. In the seat cushion 34, an electrostatic sensor 31 is also disposed. The electrostatic sensor 31 is located opposite the seat-cushion frame 34a at a distance from the seat-cushion frame 34a. The electrostatic sensor 31 is coupled with the occupant detection ECU 11 through a connector wiring 36 such as a wire harness. The electrostatic sensor 31 includes a main electrode, a sub electrode, and a guard electrode.

Figure 2:
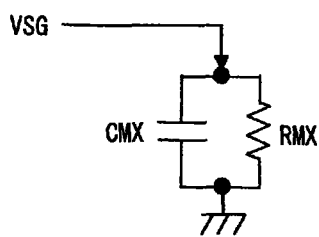
FIG. 2 is an equivalent circuit diagram of a detected object.
Figure 3:
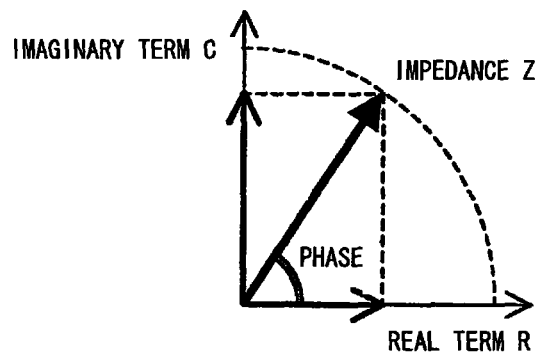
FIG. 3 is a diagram showing a signal phase of electrodes in an electrostatic sensor.
Figure 4A:
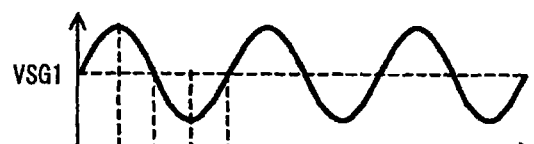
FIG. 4A is a waveform diagram showing a sine wave applied from an occupant detection ECU to a detected object.

The occupant detection ECU 11 includes a sine wave control portion 51. The sine wave control portion 51 can function as a sine wave attenuating portion and a sine wave amplifying portion. The sine wave control portion 51 includes a sine wave generator 53 and an amplitude voltage control portion 54. The amplitude voltage control portion 54 includes a DC voltage output portion 56, a linear waveform output portion 57, a switch element 58, and a switching control portion 59. The switch element 58 is a two-input one-output switch. An equivalent circuit of a detected object such as a human body and liquid detected by the electrostatic sensor apparatus 12 can be expressed by a parallel circuit of a resistance RMX (real term: conductance) and a capacitance CMX (imaginary term: susceptance) as shown in FIG. 2. Thus, rather than detecting a capacitance, the electrostatic sensor apparatus 12 detects an impedance Z having a real term R and an imaginary term C as shown in FIG. 3. The occupant detection ECU 11 applies a sine wave VSG1 shown in FIG. 4A to the detected object. When the sine wave VSG1 is applied, the switching control portion 59 outputs a control signal to the switch element 58 so that the switch element 58 connects the DC voltage output portion 56 and the sine wave generator 53. The above-described state is an occupant determination state. The sine wave generator 53 generates the sine wave VSG1 and outputs the sine wave VSG1 to the electrostatic sensor 31. The sine wave VSG1 has an amplitude corresponding to a constant DC voltage and has a predetermined constant frequency.

When the sine wave VSG1 is applied to the electrostatic sensor 31, a potential difference is generated in a current detection resistor 9 in the occupant detection ECU 11 in accordance with an impedance of a detected object. If the impedance of the detected object includes only a real term R, the potential difference generated at the current detection resistor 9 does not include a phase-lead element with respect to the sine wave VSG1. Thus, when the potential difference generated at the current detection resistor 9 is sampled based on a real-term sampling signal shown in FIG. 4B, which is in the same phase as the sine wave VSG1, an output signal depending on the magnitude of only the real term R can be obtained as shown in FIG. 4D.

If the impedance of the detected object includes only an imaginary term C, the potential difference generated at the current detection resistor 9 includes a phase-lead element with respect to the sine wave VSG1. Thus, when the potential difference generated at the current detection resistor 9 is sampled based on an imaginary-term sampling signal shown in FIG. 4C, whose phase leads by 90 degrees from the sine wave VSG1, an output signal depending on the magnitude of only the imaginary term C can be obtained as shown in FIG. 4E. An impedance of an actual detected object includes a real term R and an imaginary term C. Thus, an impedance Z having various phases is measured, and the occupant detection ECU 11 determines the detected object based on the impedance Z.

The occupant detection ECU 11 receives the impedance Z of the detected object from the electrostatic sensor apparatus 12 when the electrostatic occupant detection system 10 is in a normal operation after vehicle start-up. The occupant detection ECU 11 determines that the vehicle seat 33 is vacant, the vehicle seat 33 is equipped with a child restraint system (CRS), or the vehicle seat 33 is occupied by an adult based on the impedance Z.

The linear waveform output portion 57 selectively outputs a first linear waveform LW1 and a second linear waveform LW2. The first linear waveform LW1 inclines in a decreasing direction from a level of the DC voltage output from the DC voltage output portion 56 to a zero level at a constant inclination angle. The second linear waveform LW2 inclines in an increasing direction from the zero level to the level of the DC voltage at a constant inclination angle.

The switching control portion 59 outputs a control signal to the linear waveform output portion 57 so that the linear waveform output portion 57 outputs one of the first linear waveform LW1 and the second linear waveform LW2. The switching control portion 59 also outputs a control signal to the switch element 58 so that the switch element 58 is switched between a DC side and a linear side. When the switch element 58 is switched to the DC side, the switch element 58 connects the sine wave generator 53 with the DC voltage output portion 56. When the switch element 58 is switched to the linear side, the switch element 58 connects the sine wave generator 53 with the linear waveform output portion 57.

When the occupant detection ECU 11 switches from the occupant determination state to a diagnosis state, the switching control portion 59 outputs a control signal to the linear waveform output portion 57 so that the linear waveform output portion 57 outputs the first linear waveform LW1 and outputs a control signal to the switch element 58 so that the switch element 58 is switched from the DC side to the linear side. While the electrostatic occupant detection system 10 is in the occupant determination state, the sine wave generator 53 outputs the sine wave VSG1 having a constant amplitude. When the occupant detection ECU 11 switches from the occupant determination state to the diagnosis state, the sine wave generator 53 outputs a sine wave VSG2 whose amplitude is attenuated from the constant amplitude of the sine wave VSG1 to zero at a constant inclination angle, that is, at an attenuation rate depending on the first linear waveform LW1 while a DC bias voltage level of the amplitude is maintained. The DC bias voltage level may be referred to as a center level. Eventually, the sine wave generator 53 outputs a DC voltage DC1 at the center level of the amplitude of the sine wave VSG1.

When the occupant detection ECU 11 switches from the diagnosis state to the occupant determination state, the switching control portion 59 outputs a control signal to the linear waveform output portion 57 so that the linear waveform output portion 57 outputs the second linear waveform LW2. Then, the sine wave generator 53 outputs a sine wave VSG3 whose amplitude is amplified from zero to the constant amplitude of the sine wave VSG1 at the same inclination angle as the sine wave VSG2, that is, at an amplification rate in accordance with the second linear waveform LW2 while the center level of the amplitude is maintained. After that, the switching control portion 59 outputs a control signal to the switch element 58 so that the switch element 58 is switched from the linear side to the DC side, and the sine wave generator 53 outputs the sine wave VSG1.

The attenuation rate of the sine wave VSG2 and the amplification rate of the sine wave VSG3 are small so that when the amplitude of the sine wave changes at the attenuation rate or the amplification rate, noise having frequencies other than the sine wave frequency are not output.

Figure 6:
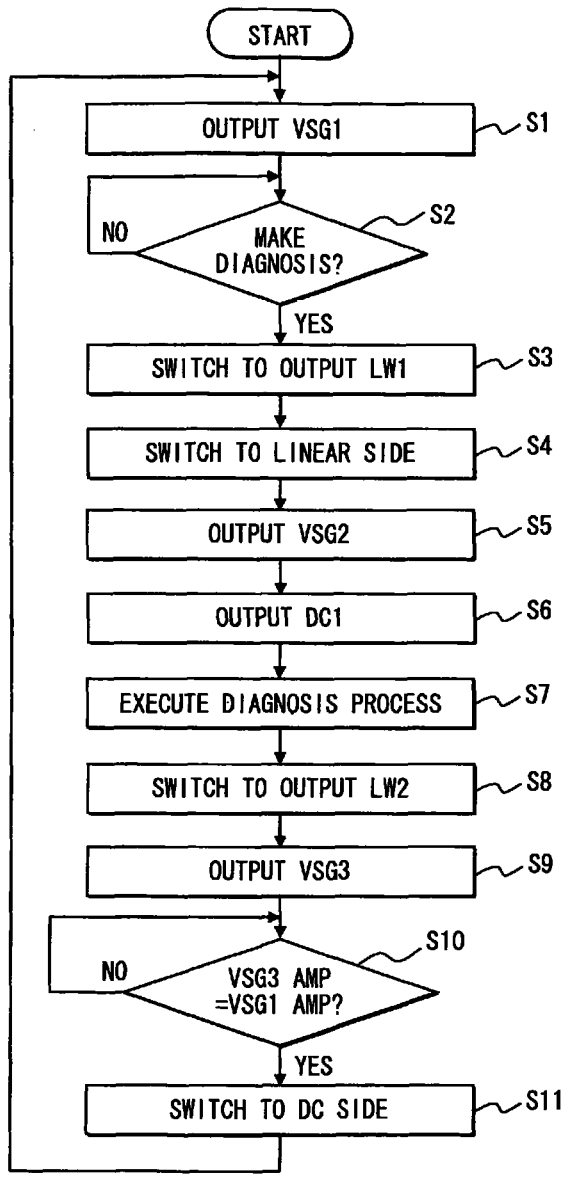
FIG. 6 is a flowchart showing a process performed by the occupant detection ECU in the electrostatic occupant detection system according to the first embodiment.

Next, a process performed by the occupant detection ECU 11 when the electrostatic occupant detection system 10 makes a diagnosis will be described with reference to FIG. 6.

At S1, the sine wave generator 53 outputs the sine wave VSG1 having the constant amplitude to the electrostatic sensor 31 when the electrostatic occupant detection system 10 is in the normal operation state after vehicle start-up. The switching control portion 59 outputs the control signal to the switch element 58 so that the switch element 58 is switched to the DC side, and the sine wave generator 53 outputs the sine wave VSG1 that has the constant amplitude corresponding to the DC voltage output from the DC voltage output portion 56. The present state is the occupant determination state.

At S2, when the occupant detection ECU 11 determines to make a diagnosis, the process proceeds to S3. At S3, the switching control portion 59 outputs a control signal to the linear waveform output portion 57 so that the linear waveform output portion 57 outputs the first linear waveform LW1. At S4, the switching control portion 59 outputs the control signal to the switch element 58 so that the switch element 58 is switched to the linear side. Then, at S5, the sine wave generator 53 outputs the sine wave VSG2 whose amplitude is attenuated from the constant amplitude of the sine wave VSG1 to zero at the constant inclination angle, that is, at the attenuation rate depending on the first linear waveform LW1 while the center level of the amplitude is maintained.

Eventually, the sine wave VSG2 becomes the DC voltage DC1 at the center level of the amplitude of the sine wave VSG1. Thus, at S6, the sine wave generator 53 outputs the DC voltage DC1. The present state is the diagnosis state. At S7, the occupant detection ECU 11 executes a diagnosis process. At S8, the switching control portion 59 outputs the control signal to the linear waveform output portion 57 so that the linear waveform output portion 57 outputs the second linear waveform LW2. Then, at S9, the sine wave generator 53 outputs the sine wave VSG3 whose amplitude is amplified from zero to the constant amplitude of the sine wave VSG1 at the constant inclination angle, that is, at the amplification rate depending on the second linear waveform LW2 while the center level of the amplitude is maintained. At S10, the occupant detection ECU 11 determines whether the amplitude of the sine wave VSG3 is the same level as the constant amplitude of the sine wave VSG1. If so, at S11, the switching control portion 59 outputs the control signal to the switch element 58 so that the switch element 58 is switched to the DC side. Then, the process returns to S1 and the sine wave generator 53 outputs the sine wave VSG1 having the constant amplitude. In other words, the electrostatic occupant detection system 10 returns to the occupant determination state.

As described above, the electrostatic occupant detection system 10 includes the electrostatic sensor 31 and the occupant detection ECU 11. The electrostatic sensor 31 includes the electrodes disposed in the vehicle seat 33 and the electrodes generate a weak electric field. The electrostatic sensor 31 outputs an electrical current or a voltage in accordance with an intensity of the weak electric field or a change in the weak electric field. The occupant detection ECU 11 outputs the sine wave for generating the weak electric field to the electrostatic sensor 31 and determines an occupant based on the voltage or the current output from the electrostatic sensor 31. When the occupant detection ECU 11 switches from the occupant determination state to the diagnosis state, the sine wave control portion 51 in the occupant detection ECU 11 gradually attenuates the amplitude of the sine wave to zero while maintaining the center level of the amplitude. In contrast, when the occupant detection ECU 11 switches from the diagnosis state to the occupant determination state, the sine wave control portion 51 gradually amplifies the amplitude of the sine wave to the constant amplitude of the sine wave in the occupant determination state while maintaining the center level of the amplitude. Because the amplitude of the sine wave is gradually attenuated or amplified, noise having frequencies other than the sine wave frequency can be reduced. Thus, an adverse effect of noise on other electronic devices including a radio can be restricted.

The sine wave control portion 51 includes the DC voltage output portion 56, the linear waveform output portion 57, the switch element 58, the switching control portion 59, and the sine wave generator 53. The DC voltage output portion 56 outputs the constant DC voltage. The linear waveform output portion 57 selectively outputs the first linear waveform LW1 and the second linear waveform LW2. The first linear waveform LW1 inclines from the level of the DC voltage output from the DC voltage output portion 56 to zero at a constant decreasing rate. The second linear waveform LW2 inclines from zero to the level of the DC voltage at a constant increasing rate that is reverse of the decreasing rate. The switch element 58 selects one of the output voltage of the DC voltage output portion 56 and the output waveform of the linear waveform output portion 57. The switching control portion 59 outputs the control signal to the linear waveform output portion 57 so that the linear waveform output portion 57 outputs the first linear waveform LW1 or the second linear wave form LW2. The switching control portion 59 also outputs the control signal to the switch element 58 so that the switch element 58 is switched to the DC side or the linear side. The sine wave generator 53 outputs one of the sine wave VSG1 having the constant amplitude depending on the DC voltage output from the DC voltage output portion 56, the sine wave VSG2 whose amplitude is attenuated from the constant amplitude of the sine wave VSG1 to zero at the attenuation rate depending on the first linear waveform LW1 while the center level of the amplitude is maintained, the DC voltage DC1 at the center level of the amplitude of the sine wave VSG1, and the sine wave VSG3 whose amplitude is amplified from zero to the constant amplitude at the amplification rate depending on the second linear waveform LW2 while the center level of the amplitude is maintained. In other words, the switching control portion 59 outputs the control signals to the linear waveform output portion 57 and the switch element 58 so that the sine wave generator 53 outputs the sine wave VSG1, the sine wave VSG2, the DC voltage DC1 at the center level, the sine wave VSG3, and the sine wave VSG1 in this order.

Therefore, in a case where the electrostatic occupant detection system 10 makes a diagnosis, firstly, the sine wave generator 53 outputs the sine wave VSG1 having the constant amplitude. Next, the sine wave generator 53 outputs the sine wave VSG2 whose amplitude is gradually attenuated from the constant amplitude to the center level of the constant amplitude. Then, the sine wave generator 53 outputs the DC voltage DC1 at the center level of the constant amplitude. The occupant detection ECU 11 executes the diagnosis process with the DC voltage DC1. Because the sine wave is gradually attenuated into the DC voltage, noise having frequencies other than the sine wave frequency can be reduced. When the sine wave VSG3 is amplified from the center level to the constant amplitude of the sine wave VSG1, the sine wave VSG3 is gradually amplified based on the second linear waveform LW2. Thus, noise having frequencies other than the sine wave frequency can be reduced. Thus, the electrostatic occupant detection system 10 can restrict generation of noise when the sine wave supplied from the occupant detection ECU 11 to the electrostatic sensor 31 is changed to the DC voltage. Therefore, an adverse effect of noise on other electronic devices including a radio can be restricted.

Second Embodiment

Figure 7:
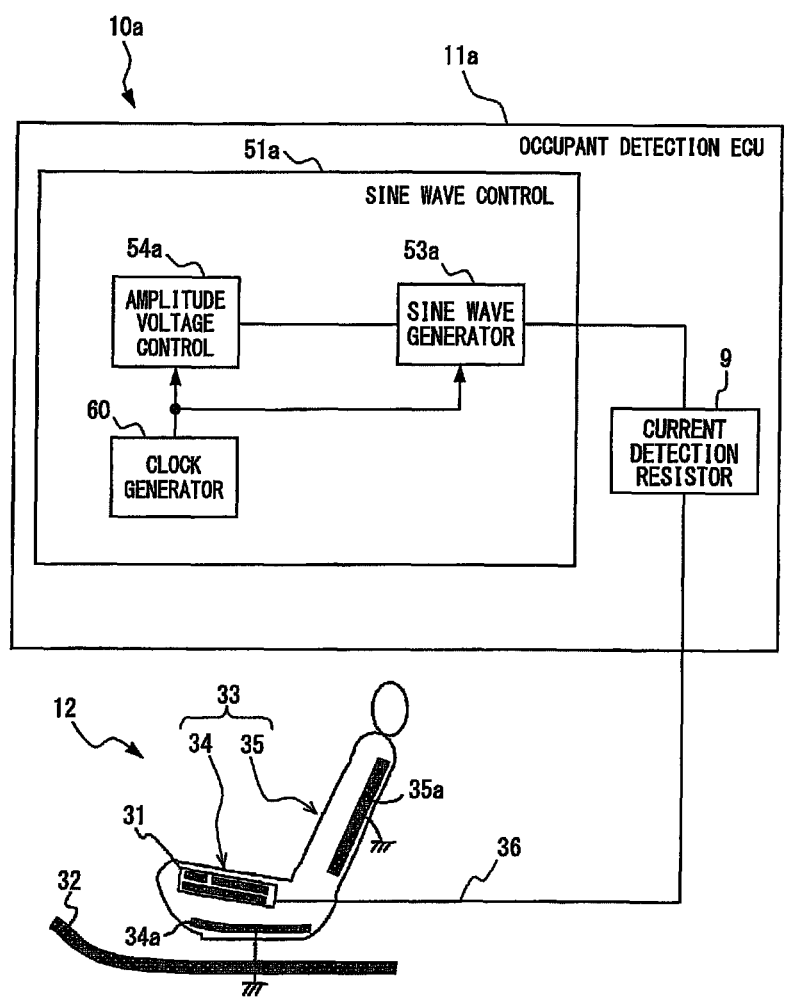
FIG. 7 is a block diagram showing an electrostatic occupant detection system according to a second embodiment of the present invention.

An electrostatic occupant detection system 10a according to a second embodiment of the present invention will be described with reference to FIG. 7. The electrostatic occupant detection system 10a includes an occupant detection ECU 11a and the electrostatic sensor apparatus 12.

The occupant detection ECU 11a includes a sine wave control portion 51a. The sine wave control portion 51a includes a sine wave generator 53a, an amplitude voltage control portion 54a, and a clock generator 60.

The clock generator 60 generates a predetermined-period clock signal and outputs the clock signal to the amplitude voltage control portion 54a and the sine wave generator 53a.

Figure 8:
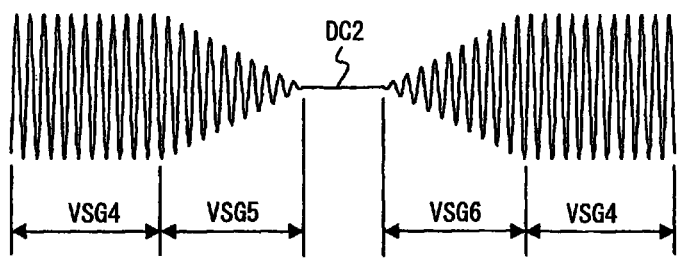
FIG. 8 is a waveform diagram showing a signal output from an occupant detection ECU in the electrostatic occupant detection system according to the second embodiment.

The sine wave generator 53a outputs one of a sine wave VSG4, a sine wave VSG5, a DC voltage DC2, and a sine wave VSG6 as shown in FIG. 8. First, the sine wave generator 53a outputs the sine wave VSG4 having a constant amplitude at a frequency depending on the clock signal. Next, the sine wave generator 53a outputs the sine wave VSG5 whose amplitude is attenuated for an N-period of the sine wave VSG4 from the constant amplitude to zero by 1/N of the constant amplitude per one period while the center level of the amplitude is maintained ("N" is a natural number). Then, the sine wave generator 53a outputs the DC voltage DC2 at the center level. After that, the sine wave generator 53a outputs the VSG6 whose amplitude is amplified for the N-period of the sine wave VSG4 from zero to the constant amplitude by 1/N of the constant amplitude per one period while the center level of the amplitude is maintained.

The amplitude voltage control portion 54a controls the amplitude of the sine waves VSG4-VSG6 output from the sine wave generator 53a. When the sine wave generator 53a outputs the sine wave VSG4 having the constant amplitude, the amplitude voltage control portion 54a controls the sine wave generator 53 so that the sine wave generator 53 outputs the sine wave VSG5 whose amplitude is attenuated for the N-period from the constant amplitude of the sine wave VSG4 to zero by 1/N per one period. When the sine wave generator 53a outputs the DC voltage DC2, the amplitude voltage control portion 54a controls the sine wave generator 53a so that the sine wave generator 53 outputs the sine wave VSG6 whose amplitude is amplified for the N-period from zero to the constant amplitude of the sine wave VSG4 amplitude by 1/N per one period.

Figure 9:
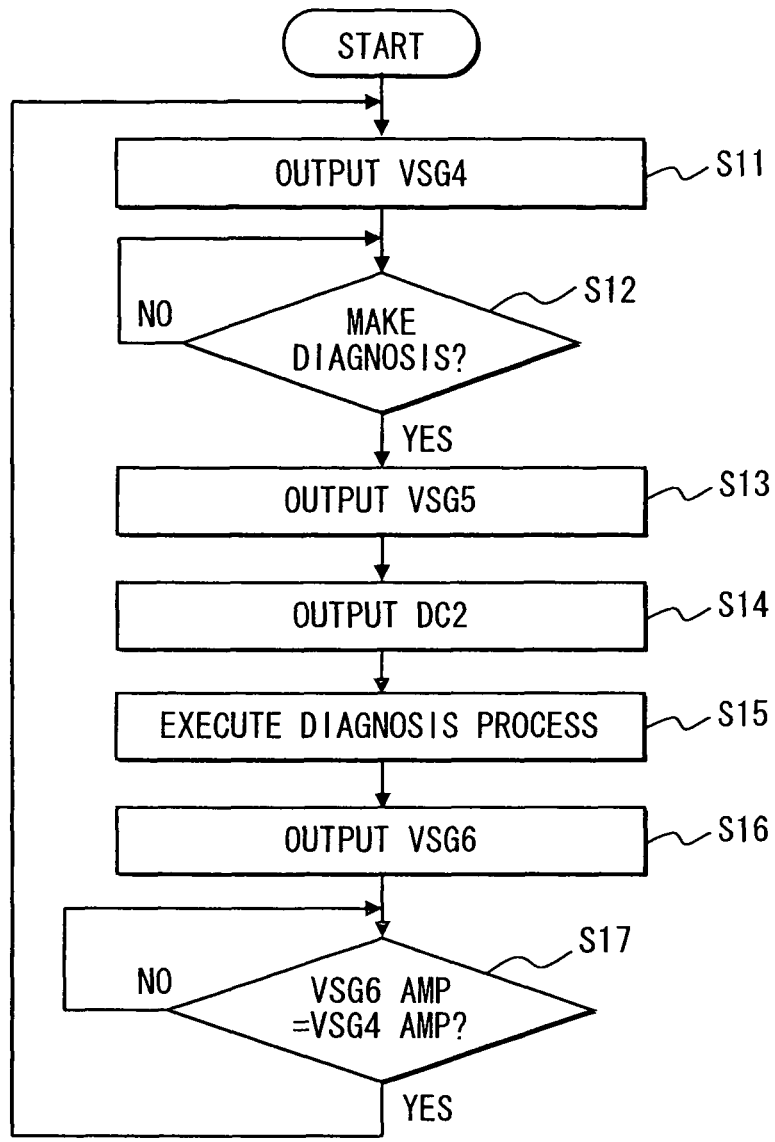
FIG. 9 is a flowchart showing a process performed by the occupant detection ECU in the electrostatic occupant detection system according to the second embodiment.

Next, a process performed by the occupant detection ECU 11a when the electrostatic occupant detection system 10a makes a diagnosis will be described with reference to FIG. 9.

At S11, the sine wave generator 53a outputs the sine wave VSG4 having the constant amplitude to the electrostatic sensor 31 at a clock frequency when the electrostatic occupant detection system 10a is in a normal operation state after vehicle start-up.

At S12, when the occupant detection ECU 11a determines to make a diagnosis, the process proceeds to S13. At S13, the amplitude voltage control portion 54a controls the sine wave generator 53a so that the amplitude of the signal output from the sine wave generator 53a is attenuated for the N-period from the constant amplitude of the sine wave VSG4 to the center level of the sine wave VSG4 by 1/N per one period. Thus, the sine wave generator 53a outputs the sine wave VSG5 whose amplitude is attenuated from the constant amplitude to zero by 1/N per one period while the center level of the amplitude is maintained. At S14, the sine wave generator 53a outputs the DC voltage DC2 at the center level.

In the present state, the occupant detection ECU 11a executes a diagnosis process at S15. After that, the amplitude voltage control portion 54a controls the sine wave generator 53a so that the amplitude of the signal output from the sine wave generator 53a is attenuated for the N-period from the center level, that is, the DC voltage DC2 to the constant amplitude of the sine wave VSG4 by 1/N per one period.

Thus, the sine wave generator 53a outputs the sine wave VSG5 whose amplitude is attenuated by 1/N per one period at the frequency depending on the clock signal.

At S17, when the amplitude of the sine wave VSG6 becomes the same level as the constant amplitude of the sine wave VSG4, the process returns to S11, and the sine wave generator 53a outputs the sine wave VSG4 having the constant amplitude.

As described above, the electrostatic occupant detection system 10a includes the occupant detection ECU 11a including the sine wave control portion 51a. First, the sine wave control portion 51a outputs the sine wave VSG4 at the constant amplitude. Next, the amplitude of the sine wave is attenuated for the N-period from the constant amplitude to the center level of the sine wave VSG4 by 1/N per one period. Then, the sine wave control portion 51a outputs the DC voltage at the center level. After that, the amplitude of the DC voltage is amplified for the N-period from the center level to the constant amplitude of the sine wave VSG4 by 1/N per one period.

Thus, when the electrostatic occupant detection system 10a makes the diagnosis after vehicle start-up, the amplitude of the sine wave is attenuated for the N-period from the constant amplitude to the center level by 1/N per one period. The diagnosis is performed with the DC voltage at the center level. Because the amplitude of the sine wave is gradually attenuated from the constant amplitude to the center level, noise having frequencies other than the sine wave frequency can be reduced. Also when the amplitude is amplified from the center level to the constant amplitude, the amplitude is increased by 1/N per period. Thus, noise having frequency other than the sine wave frequency can be reduced. Thus, the electrostatic occupant detection system 10a can restrict generation of noise when the sine wave supplied from the occupant detection ECU 11a to the electrostatic sensor 31 is changed to the DC voltage. Therefore, an adverse effect of noise on other electronic devices including a radio can be restricted.

Third Embodiment

Figure 10:
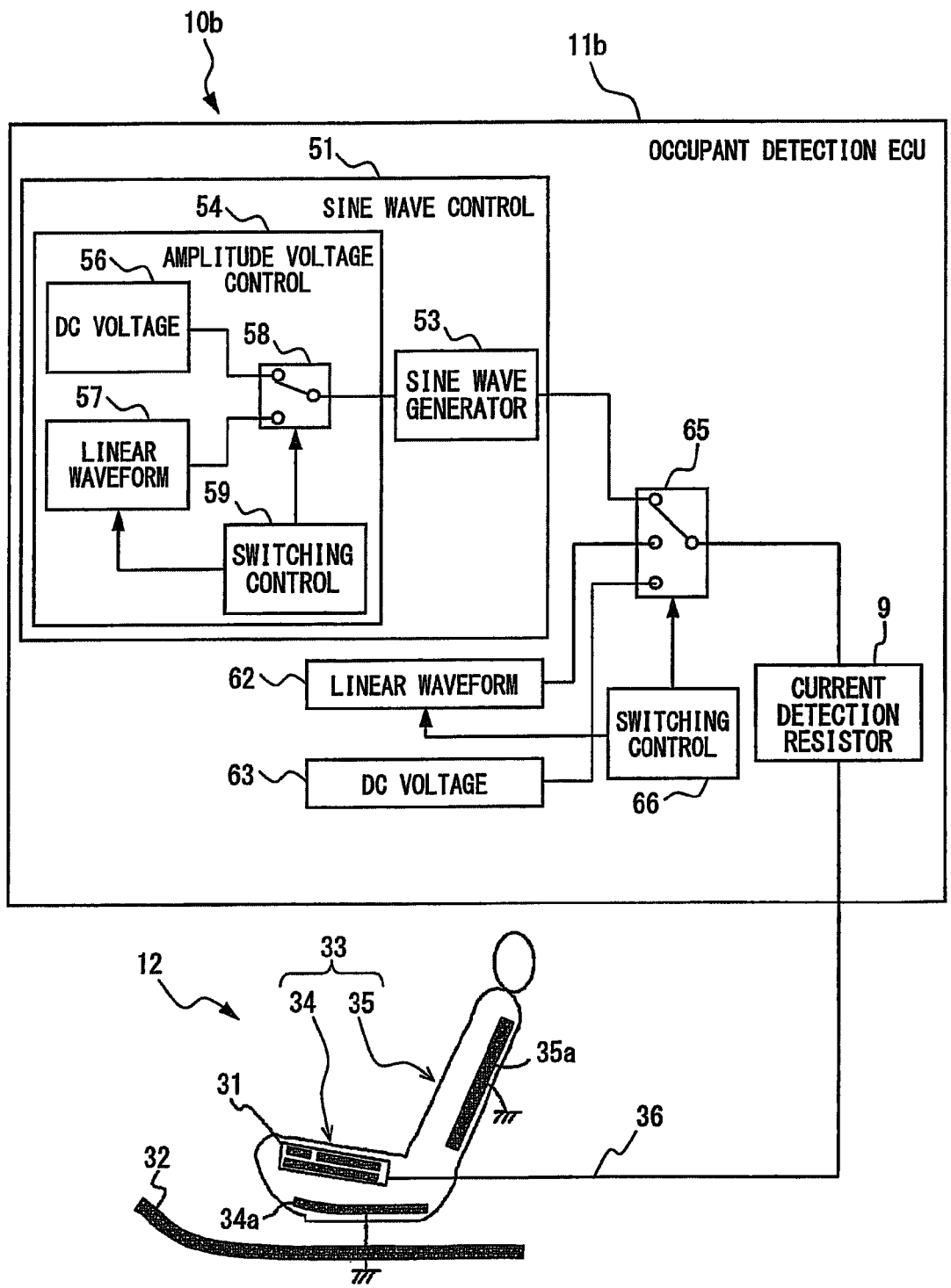
FIG. 10 is a block diagram showing an electrostatic occupant detection system according to a third embodiment of the present invention.

An electrostatic occupant detection system 10b according to a third embodiment of the present invention will be described with reference to FIG. 10. The electrostatic occupant detection system 10b includes an occupant detection ECU 11b and the electrostatic sensor apparatus 12.

The occupant detection ECU 11b includes the sine wave control portion 51 described in the first embodiment, a linear waveform output portion 62, a DC voltage output portion 63, a switch element 65, and an output switching control portion 66. The switch element 65 is a three-input one-output switch.

The switch element 65 has three input terminals, and the input terminals are coupled with output terminals of the sine wave generator 53, the linear waveform output portion 62, and the DC voltage output portion 63, respectively. The switch element 65 selects an output signal from one of the output terminals based on a control signal from the output switching control portion 66 and outputs the selected signal to the electrostatic sensor 31 through the connector wiring 36.

The linear waveform output portion 62 selectively outputs a third linear waveform LW3 and a fourth linear waveform LW4 by a slew rate control. The third linear waveform inclines in a decreasing direction from the center level of the sine wave VSG1, to which the amplitude of the sine wave VSG2 is attenuated, to a predetermined level L3 at a constant inclination angle. The fourth linear waveform LW4 inclines in an increasing direction from the predetermined level L3 to the center level at a constant inclination angle. The third linear waveform LW3 and the fourth linear waveform LW4 are line symmetry The DC voltage output portion 63 outputs a DC voltage DC3 at the predetermined level L3.

Figure 11:
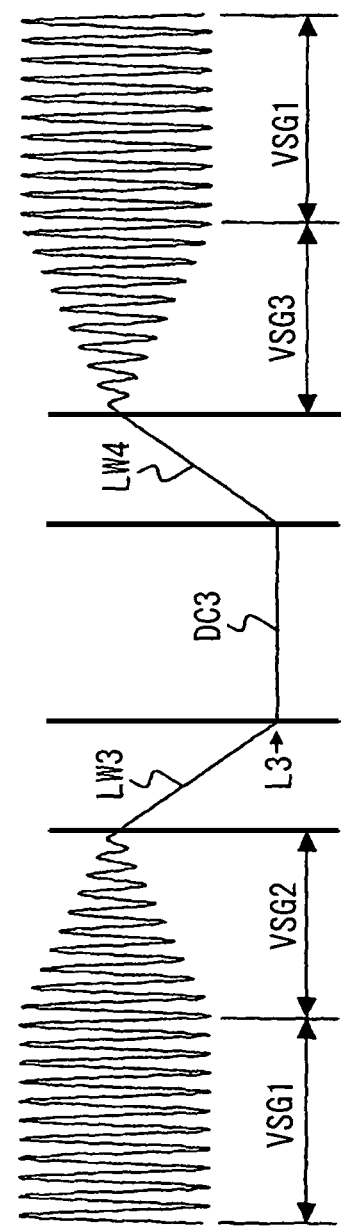
FIG. 11 is a waveform diagram showing a signal output from an occupant detection ECU in the electrostatic occupant detection system according to the third embodiment.

The output switching control portion 66 outputs a control signal to the linear waveform output portion 62 so that linear waveform output portion 62 outputs the third linear waveform LW3 or the fourth linear waveform LW4. Furthermore, the output switching control portion 66 outputs a control signal to the switch element 65 so that the switch element 65 selects the output signal of the sine wave generator 53. As shown in FIG. 11, the sine wave VSG1 and the sine wave VSG2 are output in order. When the amplitude of the sine wave VSG2 is attenuated to the center level, the linear waveform output portion 62 outputs the third linear waveform LW3, and the switch element 65 selects the third linear waveform LW3. When the third linear waveform LW3 decreases to the predetermined level L3, the switch element 65 selects the DC voltage DC3 output from the DC voltage output portion 63. After a predetermined time, the linear waveform output portion 62 outputs the fourth linear waveform LW4, and the switch element 65 selects the fourth linear waveform LW4. When the fourth linear waveform LW4 increases to the center level, the switch element 65 selects the output signal from the sine wave generator 53. Accordingly, the sine wave VSG3 and the sine wave VSG1 are output in order.

Figure 12:
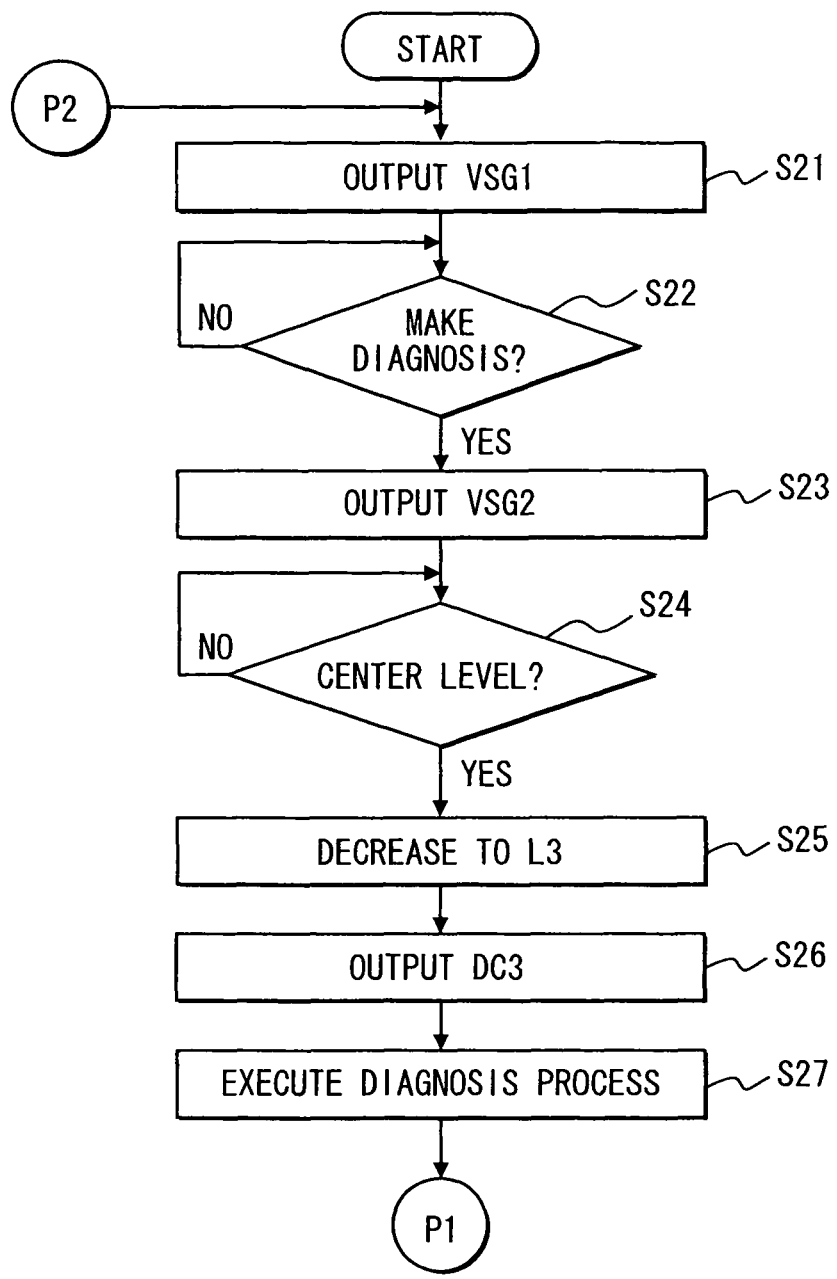
FIG. 12 is a flowchart showing a part of a process performed by the occupant detection ECU in the electrostatic occupant detection system according to the third embodiment.

Next, a process performed by the occupant detection ECU 11b when the electrostatic occupant detection system 10b makes a diagnosis will be described with reference to FIG. 12 and FIG. 13.

At S21, the sine wave generator 53 outputs the sine wave VSG1 having the constant amplitude to the electrostatic sensor 31 when the electrostatic occupant detection system 10b is in a normal operation state after vehicle start-up.

At S22, when the occupant detection ECU 11b determines to make a diagnosis, the process proceeds to S23. At S23, the switching control portion 59 outputs a control signal to the linear waveform output portion 57 so that the linear waveform output portion 57 outputs the first linear waveform LW1. In addition, the switching control portion 59 controls the switch element 58 so that the switch element 58 selects the first linear waveform LW1. Accordingly, the sine wave generator 53 outputs the sine wave VSG2 attenuated at the constant inclination angle.

At S24, when the occupant detection ECU 11b determines that the sine wave VSG2 becomes the center level of the amplitude of the sine wave VSG1, the process proceeds to S25. At S25, the occupant detection ECU 11b performs a slew rate control where the voltage decreases from the center level to the predetermined level L3 based on the third linear waveform LW3. The output switching control portion 66 outputs a control signal to the linear waveform output portion 62 and the switch element 65 so that the linear waveform output portion 62 outputs the third linear waveform LW3 and the switch element 65 selects the third linear waveform LW3.

At S26, the output switching control portion 66 outputs a control signal to the switch element 65 so that the switch element 65 selects the DC voltage DC3 output from the DC voltage output portion 63. Accordingly, the DC voltage DC3 at the predetermined level L3 is output to the electrostatic sensor 31. In the present state, the occupant detection ECU 11b executes a diagnosis process at S27.

Figure 13:
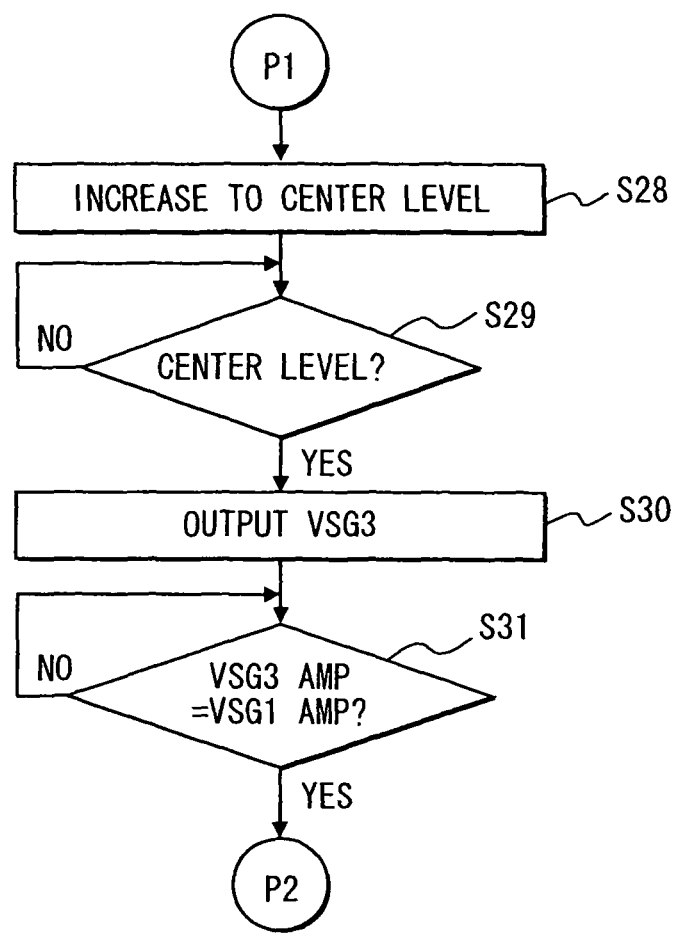
FIG. 13 is a flowchart showing another part of the process performed by the occupant detection ECU in the electrostatic occupant detection system according to the third embodiment.

At S28 shown in FIG. 13, the occupant detection ECU 11b performs the slew rate control for increasing the voltage from the predetermined level L3 to the center level. In this process, the output switching control portion 66 outputs control signals to the linear waveform output portion 62 and the switch element 65 so that the linear waveform output portion 62 outputs the fourth linear waveform LW4 and the switch element 65 selects the fourth linear waveform LW4. At S29, the occupant detection ECU 11b determines whether the voltage becomes the center level. If so, at S30, the switching control portion 59 outputs a control signal to the linear waveform output portion 57 so that the linear waveform output portion 57 outputs the second linear waveform LW2. Then, the sine wave generator 53 outputs the sine wave VSG3 whose amplitude is amplified from the center level at the amplification rate depending on the second linear waveform LW2. The output switching control portion 66 outputs a control signal to the switch element 65 so that the switch element 65 selects the sine wave VSG3. Accordingly, the occupant detection ECU 11b outputs the sine wave VSG3 whose amplitude is amplified at the constant inclination angle.

At S17, when the amplitude of the sine wave VSG3 becomes the same level as the constant amplitude of the sine wave VSG1, the process returns to S21, and the switch element 65 selects the sine wave VSG4 having the constant amplitude and output from the sine wave generator 53 through the DC voltage output portion 56 and the switch element 58.

Thus, the electrostatic occupant detection system 10b according to the present embodiment includes the occupant detection ECU 11b including a DC shift control portion. The DC shift control portion decreases the output voltage from the center level of the amplitude of the sine wave attenuated by the sine wave control portion 51 to the predetermined level by the slew rate control, outputs the DC voltage at the predetermined level, and increases the voltage to the center level by the slew rate control. The DC shift control portion includes the linear waveform output portion 62, the DC voltage output portion 63, the switch element 65, and the output switching control portion 66. The DC shift control portion and the sine wave control portion 51 provide a diagnosis state transition portion and an occupant determination state transition portion.

In the electrostatic occupant detection system 10b according to the present embodiment, after the sine wave is attenuated to the center level in such a manner that noise are not generated, the voltage is decreased to the predetermined level by the slew rate control and the voltage is increased from the predetermined level to the center level by the slew rate control. Thus, the voltage is changed between the center level and the predetermined level while generation of noise is restricted. Thus, the electrostatic occupant detection system 10b can restrict generation of noise when the sine wave supplied from the occupant detection ECU 11b to the electrostatic sensor 31 is changed to the DC voltage at the predetermined level.

In the above-described example, the voltage is decreased to the predetermined level L3, as an example. The voltage may also be decreased from the center level to the ground level. In the present case, after the voltage is decreased to the earth level by a linear wave from the linear waveform output portion 62, the ground level is maintained for a predetermined time, and then, the voltage is increased to the center level. Thus, the DC voltage output portion 63 may be ground. Instead of the sine wave control portion 51 shown in FIG. 10, the sine wave control portion 51a shown in FIG. 7 may also be used.

Fourth Embodiment

Figure 14:
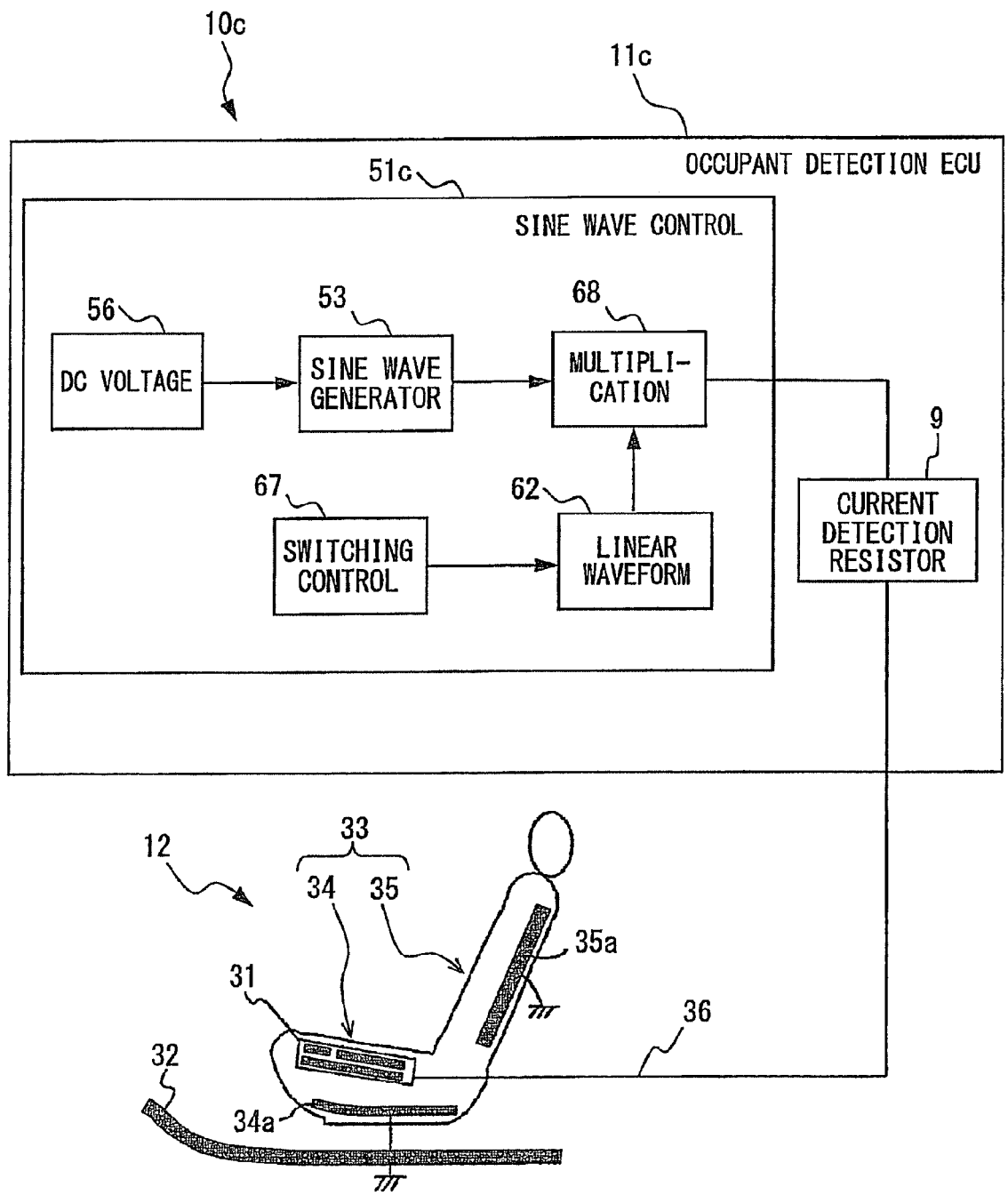
FIG. 14 is a block diagram showing an electrostatic occupant detection system according to a fourth embodiment of the present invention.
Figure 15:
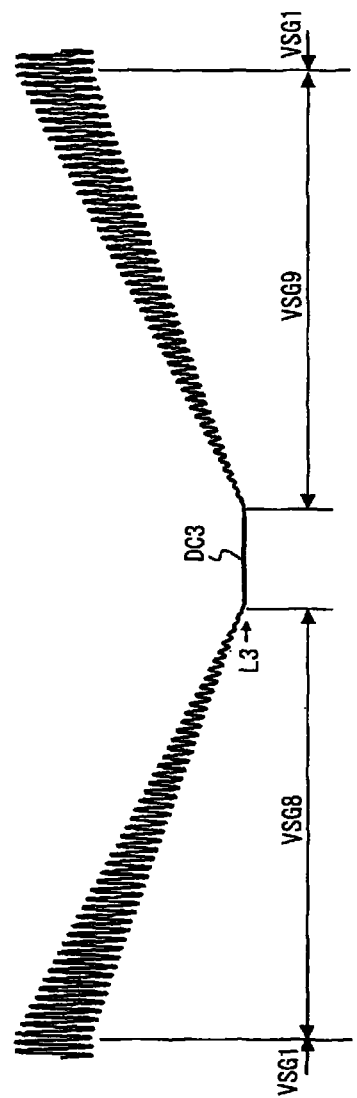
FIG. 15 is a waveform diagram showing a signal output from an occupant detection ECU in the electrostatic occupant detection system according to the fourth embodiment.

An electrostatic occupant detection system 10c according to a fourth embodiment of the present invention will be described with reference to FIG. 14. The electrostatic occupant detection system 10b includes an occupant detection ECU 11c and the electrostatic sensor apparatus 12. The occupant detection ECU 11c includes a sine wave control portion 51c.

The sine wave control portion 51c includes the DC voltage output portion 56 and the sine wave generator 53 described in the first embodiment, the linear waveform output portion 62 described in the third embodiment, a switching control portion 67, and a multiplication portion 68.

The switching control portion 67 controls the linear waveform output portion 62 so that the linear waveform output portion 62 outputs the third linear waveform LW3 or the fourth linear waveform LW4 to the multiplication portion 68 or stops outputting the waveform.

The multiplication portion 68 multiplies the sine wave VSG1 having the constant amplitude and output from the sine wave generator 53 and the third linear waveform LW3 or the fourth linear waveform LW4 output from the linear waveform output portion 62 and outputs an attenuated sine wave VSG8 or an amplified sine wave VSG9 obtained by the multiplication to the electrostatic sensor 31 through the connector wiring 36. While the linear waveform output portion 62 stops outputting the waveform, the multiplication portion 68 does not performs a multiplication process and outputs the sine wave VSG1 from the sine wave generator 53.

The attenuated sine wave VSG8 is obtained by multiplying the sine wave VSG1 and the third linear waveform LW3. The attenuated sine wave VSG8 is attenuated from the constant amplitude of the sine wave VSG1 while decreasing to the predetermined level L3 in a constant inclination angle depending on the third linear waveform LW3.

The amplified sine wave VSG9 is obtained by multiplying the sine wave VSG1 and the fourth linear waveform LW4. The amplified sine wave VSG9 is amplified to the constant amplitude of the sine wave VSG1 while increasing from the predetermined level L3 in a constant inclination angle depending on the fourth linear waveform LW4.

Figure 16:
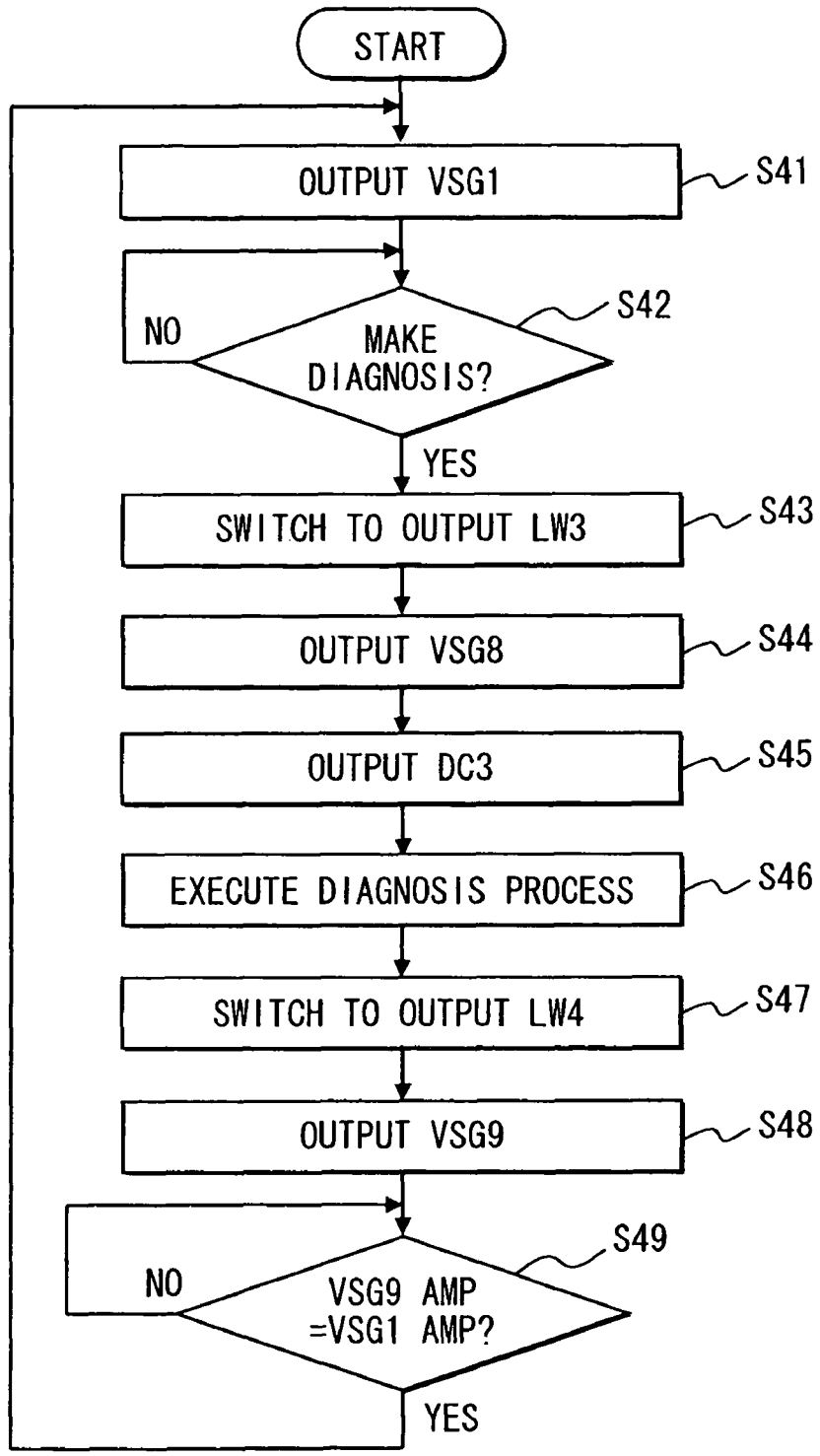
FIG. 16 is a flowchart showing a process performed by the occupant detection ECU in the electrostatic occupant detection system according to the fourth embodiment.

Next, a process performed by the occupant detection ECU 11c when the electrostatic occupant detection system 10c makes a diagnosis will be described with reference to FIG. 16.

At S41, the sine wave generator 53 outputs the sine wave VSG1 having the constant amplitude to the electrostatic sensor 31 when the electrostatic occupant detection system 10c is in a normal operation state after engine start-up and the linear waveform output portion 62 does not output the waveform.

At S42, when the occupant detection ECU 11c determines to make a diagnosis, the process proceeds to S43. At S43, the switching control portion 67 outputs the control signal to the linear waveform output portion 62 so that the linear waveform output portion 62 outputs the third linear waveform LW3. At S44, the multiplication portion 68 multiplies the sine wave VSG1 and the third waveform LW3 and outputs the attenuated sine wave VSG8.

At S45, when the attenuated sine wave VSG8 decreases to the predetermined level L3, the DC voltage DC3 at the predetermined level L3 is output to the electrostatic sensor 31. In the present state, the occupant detection ECU 11c executes a diagnosis process at S46.

At S47, the switching control portion 67 outputs the control signal to the linear waveform output portion 62 so that the linear waveform output portion 62 outputs the fourth linear waveform LW4. At S48, the multiplication portion 68 multiplies the sine wave VSG1 and the third waveform LW4 and outputs the amplified sine wave VSG9.

At S49, when the occupant detection ECU 11c determines that the amplitude of the amplified sine wave VSG9 becomes the constant amplitude of the sine wave VSG1, the process returns to S41, and the sine wave VSG1 having the constant amplitude is output.

As described above, the electrostatic occupant detection system 10c includes the occupant detection ECU 11c including the sine wave control portion 51c. The sine wave control portion 51c multiplies the sine wave VSG1 having the constant amplitude by the third linear waveform LW3 or the fourth linear waveform LW4. The third linear waveform LW3 decreases from the amplitude level of the sine wave VSG1 to the predetermined level L3 at the constant inclination angle. The fourth linear waveform LW4 increases from the predetermined level L3 to the amplitude level of the sine wave VSG1 at the constant inclination angle.

Thus, when the sine wave VSG1 having the constant amplitude is multiplied by the third linear waveform LW3 to provide the attenuated sine wave VSG8, the center level of the sine wave VSG8 decreases to the predetermined level L3 while being attenuated constantly. At the predetermined level L3, the attenuation of the sine wave VSG8 ends and the DC voltage DC3 at the predetermined level L3 is output. Because the sine wave VSG8 is gradually attenuated when the output signal is changed from the sine wave VSG1 to the DC voltage DC3 at the predetermined level, noise having frequencies other than the sine wave frequency can be reduced. When the sine wave VSG1 is multiplied by the fourth linear waveform LW4 to provide the attenuated sine wave VSG9, the center level of the sine wave VSG9 increases from the predetermined level L3 to the center level of the sine wave VSG1 while being amplified constantly. Also in the present case, because the sine wave VSG9 is gradually amplified, noise having frequencies other than the sine wave frequency can be reduced. Thus, the electrostatic occupant detection system 10c can restrict generation of noise when the sine wave supplied from the occupant detection ECU 11c to the electrostatic sensor 31 is changed to the DC voltage. Therefore, adverse effects of noise on other electronic devices including a radio can be restricted.

Fifth Embodiment

Figure 17:
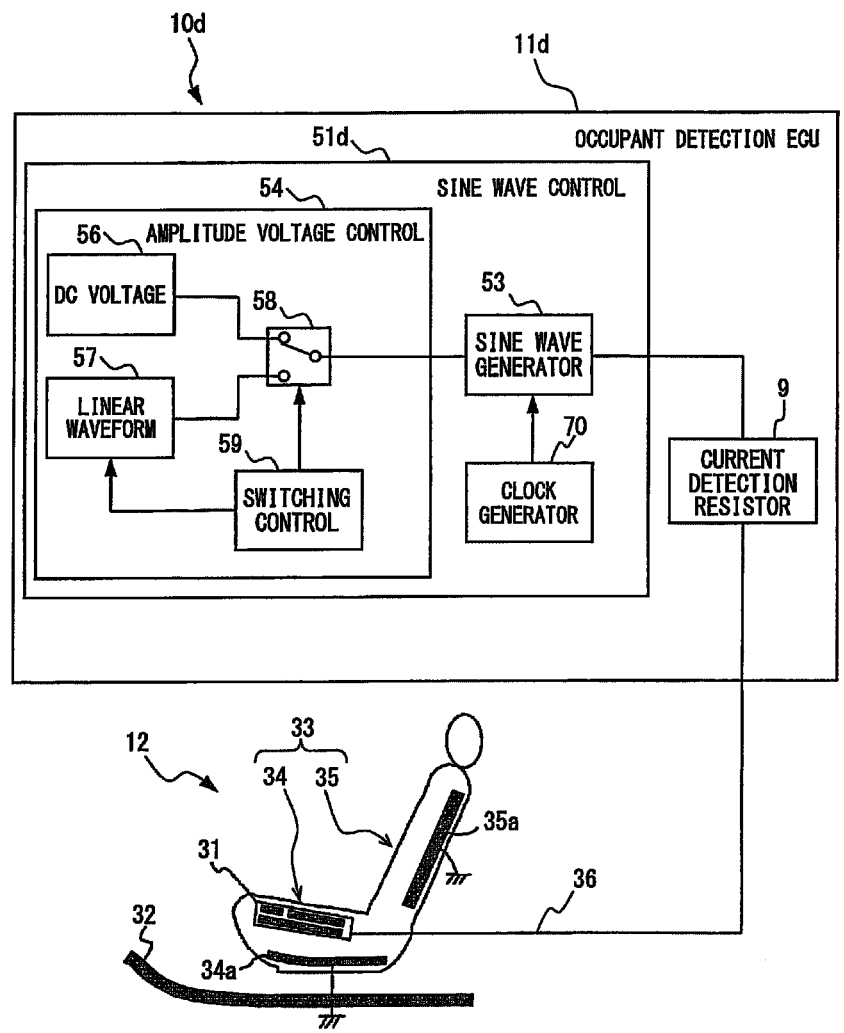
FIG. 17 is a block diagram showing an electrostatic occupant detection system according to a fifth embodiment of the present invention.

In each of the above-described embodiments, the amplitude of the sine wave is changed when the occupant detection ECU 11 switches between the occupant determination state and the diagnosis state. In an electrostatic occupant detection system 10d according to a fifth embodiment of the present invention, a frequency of a sine wave is changed. The electrostatic occupant detection system 10d will be described with reference to FIG. 17. The electrostatic occupant detection system 10d includes an occupant detection ECU 11d including a sine wave control portion 51d. The sine wave control portion 51d includes a clock generator 70 in addition to the configuration of the sine wave control portion 51 described in the first embodiment.

The clock generator 70 generates a clock signal and can change a clock frequency of the clock signal. The clock signal generated by the clock generator 70 is input to the sine wave generator 53. The sine wave generator 53 generates a sine wave having a frequency depending on the clock signal. Thus, by controlling the frequency of the clock signal generated by the clock generator 70, the frequency of the sine wave generated by the sine wave generator 53 can be controlled.

The clock generator 70 receives a diagnosis state transition signal that orders a transition from the occupant determination state to the diagnosis state and an occupant determination state transition signal that orders a transition from the diagnosis state to the occupant determination state. The signals may be generated when a predetermined diagnosis time arrives and the signals may be generated based on an operation by a user.

When the clock generator 70 receives the diagnosis state transition signal, the clock generator 70 gradually decreases the frequency of the clock signal from the frequency in the occupant determination state to a predetermined frequency with a predetermined time. When the clock generator 70 receives the occupant determination state transition signal, the clock generator 70 gradually increases the frequency of the clock signal from the frequency in the diagnosis state to the frequency in the occupant determination state with a predetermined period.

Figure 18A:
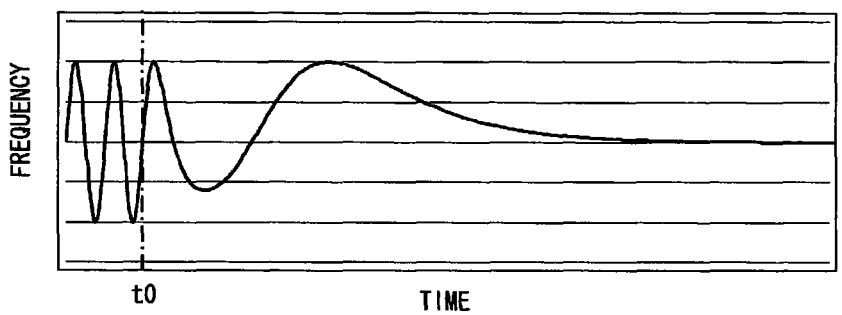
FIG. 18A is a diagram showing a change of a sine wave at a time when the electrostatic occupant detection system according to the fifth embodiment switches from an occupant determination state to a diagnosis state and FIG. 18B is a diagram showing a change of the sine wave at a time when the electrostatic occupant detection system according to the fifth embodiment switches from the diagnosis state to the occupant determination state.
Figure 18B:
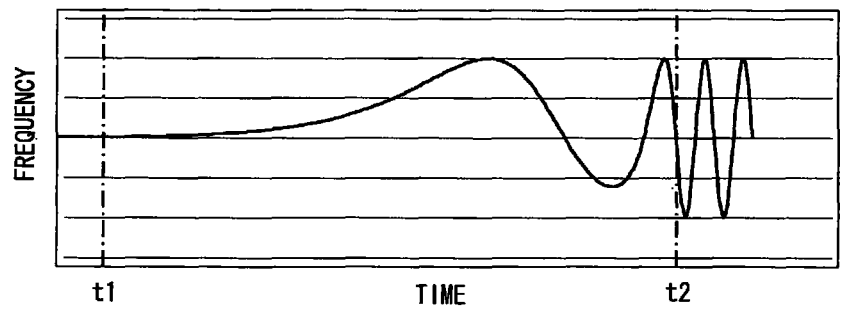

FIG. 18A is a diagram showing a change of the sine wave when the electrostatic occupant detection system 10d switches from the occupant determination state to the diagnosis state and FIG. 18B is a diagram showing a change of the sine wave when the electrostatic occupant detection system 10d switches from the diagnosis state to the occupant determination state. As shown in FIG. 18A, the frequency is constant before time t0 when the diagnosis state transition signal is input. After the time t0, the frequency is gradually decreased while a center level of the amplitude is maintained. As shown in FIG. 18B, after the time t1 when the occupant determination state transition state is input, the frequency is gradually increased while the center level of the amplitude is maintained. Time t2 in FIG. 18B indicates a time when the frequency becomes the frequency in the occupant determination state.

(First Modification of Fifth Embodiment)

Figure 19A:
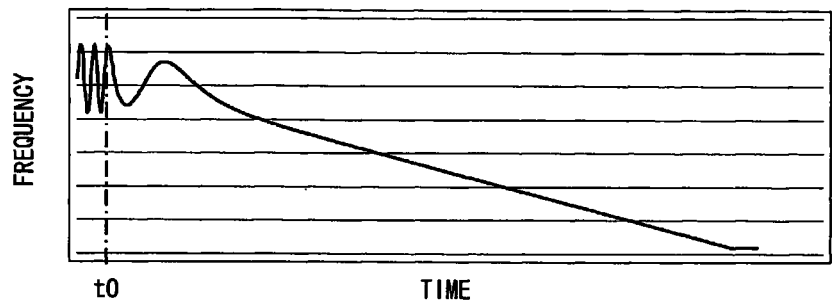
FIG. 19A is a diagram showing a change of a sine wave when an electrostatic occupant detection system according to a first modification of the fifth embodiment switches from an occupant determination state to a diagnosis state and FIG. 19B is a diagram showing a change of the sine wave when the electrostatic occupant detection system according to the first modification of the fifth embodiment switches from the diagnosis state to the occupant determination state.
Figure 19B:
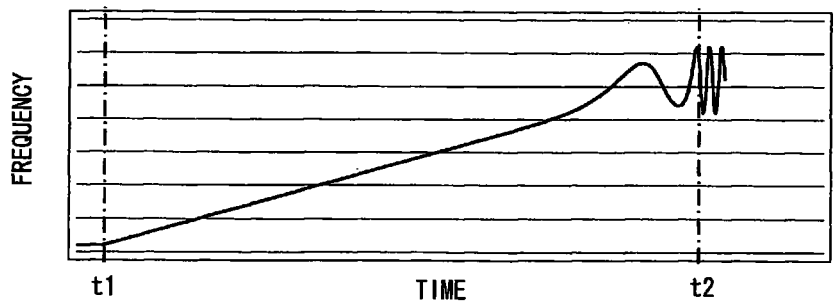

The electrostatic occupant detection system 10d according to the fifth embodiment changes the frequency while maintaining the center level of the amplitude of the sine wave, as an example. As shown in FIG. 19A and FIG. 19B, the electrostatic occupant detection system 10d may also change the center level of the amplitude while changing the frequency. FIG. 19A is a diagram showing a change of the sine wave when the electrostatic occupant detection system 10d switches from the occupant determination state to the diagnosis state in the first modification of the fifth embodiment and FIG. 18B is a diagram showing a change of the sine wave when the electrostatic occupant detection system 10d switches from the diagnosis state to the occupant determination state in the first modification of the fifth embodiment.

(Second Modification of Fifth Embodiment)

Figure 20A:
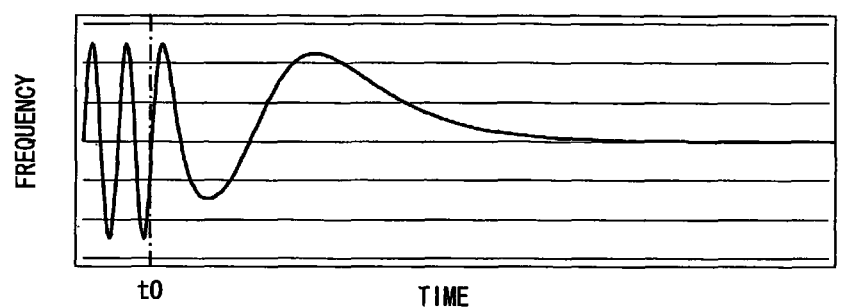
FIG. 20A is a diagram showing a change of a sine wave when an electrostatic occupant detection system according to a second modification of the fifth embodiment switches from an occupant determination state to a diagnosis state and FIG. 20B is a diagram showing a change of the sine wave when the electrostatic occupant detection system according to the second modification of the fifth embodiment switches from the diagnosis state to the occupant determination state.
Figure 20B:
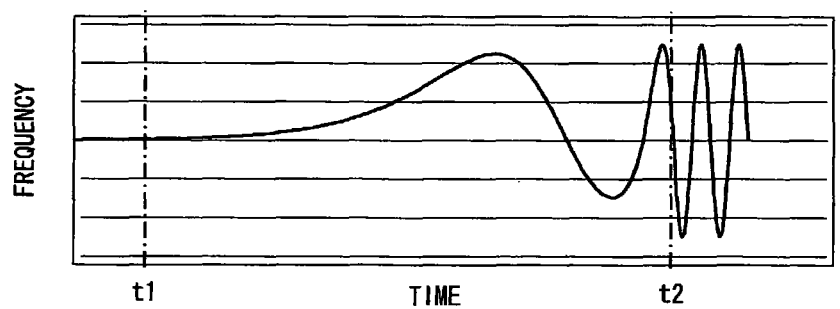

Alternatively, both the frequency and the amplitude may also be changed. FIG. 20A is a diagram showing a change of the sine wave when the electrostatic occupant detection system 10d switches from the occupant determination state to the diagnosis state in the second modification of the fifth embodiment and FIG. 20B is a diagram showing a change of the sine wave when the electrostatic occupant detection system 10d switches from the diagnosis state to the occupant determination state in the second modification of the fifth embodiment.

Other Embodiments

Although the present invention has been fully described in connection with the preferred embodiments thereof with reference to the accompanying drawings, it is to be noted that various changes and modifications will become apparent to those skilled in the art.

In each of the above-described embodiments, the amplitude or the frequency is gradually changed in both a case where the occupant detection ECU switches from the occupant determination state to the diagnosis state and a case where the occupant detection ECU switches from the diagnosis state to the occupant determination state. However, not limited to the above-described embodiments, the amplitude or the frequency may also be gradually changed only at one of the transitions and the amplitude or the frequency may also be changed rapidly at the other one of the transitions.

What is claimed is:

1. An electrostatic occupant detection system, comprising:
an electrostatic sensor including an electrode disposed in a vehicle seat; and
an electronic control unit configured to output a sine wave to the electrostatic sensor to have the electrode generate an electric field, the electronic control unit including a current detection resistor connected to the electrostatic sensor, the electronic control unit detecting an electric current or a voltage at the current detection resistor which changes in accordance with the electric field, the electric control unit determining the presence of an occupant based on the electric current or the voltage, wherein
the electronic control unit is switchable between an occupant determination state in which the electronic control unit outputs a sine wave having a constant amplitude and a diagnosis state in which the electronic control unit maintains a direct current DC voltage of the electrostatic sensor at a constant level, and
the electronic control unit gradually changes at least one of an amplitude and a frequency of the sine wave when the electronic control unit switches from the occupant determination state to the diagnosis state or when the electronic control unit switches from the diagnosis state to the occupant determination state.

2. The electrostatic occupant detection system according to claim 1, wherein
the electronic control unit gradually changes the amplitude of the sine wave when the electronic control unit switches from the occupant determination state to the diagnosis state or when the electronic control unit switches from the diagnosis state to the occupant determination state.

3. The electrostatic occupant detection system according to claim 2, wherein:
the constant level of the DC voltage of the electrostatic sensor in the diagnosis state is different from a DC bias voltage level of the sine wave output in the occupant determination state;
the electronic control unit includes at least one of a sine wave attenuation portion and a sine wave amplification portion;
the sine wave attenuation portion gradually attenuates the amplitude of the sine wave to zero while increasing or decreasing the DC bias voltage level of the sine wave so that the voltage of the electrostatic sensor becomes the constant level; and
the sine wave amplification portion gradually amplifies the amplitude of the sine wave to the constant amplitude of the sine wave in the occupant determination state while increasing or decreasing the DC bias voltage level of the sine wave so that the voltage of the electrostatic sensor becomes the DC bias voltage level of the sine wave in the occupant determination state.

4. The electrostatic occupant detection system according to claim 2, wherein:
the constant level of the DC voltage of the electrostatic sensor in the diagnosis state is lower than the DC bias voltage level of the sine wave output in the occupant determination state;
the electronic control unit includes at least one of a sine wave attenuation portion and a sine wave amplification portion;
the sine wave attenuation portion attenuates the amplitude of the sine wave while decreasing the DC bias voltage level of the sine wave by multiplying the sine wave that has the constant amplitude and is output in the occupant determination state by a first output signal that linearly decreases from the DC bias voltage level of the sine wave in the occupant determination state to the constant level of the DC voltage level in the diagnosis state; and
the sine wave amplification portion amplifies the amplitude of the sine wave while increasing the DC bias voltage level of the sine wave by multiplying the sine wave that has the constant amplitude and is output in the occupant determination state by a second output signal that linearly increases from the constant level of the DC voltage level in the diagnosis state to the DC bias voltage level of the sine wave in the occupant determination state.

5. The electrostatic occupant detection system according to claim 2, wherein:
the constant level of the DC voltage of the electrostatic sensor in the diagnosis state is equal to the DC bias voltage level of the sine wave output in the occupant determination state;
the electronic control unit includes at least one of a sine wave attenuation portion and a sine wave amplification portion;
the sine wave attenuation portion gradually attenuates the amplitude of the sine wave output to the electrostatic sensor from the constant amplitude in the occupant determination state to zero while maintaining the DC bias voltage level of the sine wave; and
the sine wave amplification portion gradually amplifies the amplitude of the sine wave output to the electrostatic sensor to the constant amplitude in the occupant determination state while maintaining the DC bias voltage level of the sine wave.

6. The electrostatic occupant detection system according to claim 2, wherein:
the constant level of the voltage of the electrostatic sensor in the diagnosis state is equal to the DC bias voltage level of the sine wave output in the occupant determination state;
the electronic control unit includes at least one of a sine wave attenuation portion and a sine wave amplification portion;
the sine wave attenuation portion attenuates the amplitude of the sine wave output to the electrostatic sensor from the constant amplitude in the occupant determination state to zero at a constant attenuation rate while maintaining the DC bias voltage level of the sine wave; and
the sine wave amplification portion amplifies the amplitude of the sine wave output to the electrostatic sensor to the constant amplitude in the occupant determination state at a constant amplification rate while maintaining the DC bias voltage level of the sine wave.

7. The electrostatic occupant detection system according to claim 2, wherein:
the constant level of the DC voltage of the electrostatic sensor in the diagnosis state is equal to the DC bias voltage level of the sine wave output in the occupant determination state;
the electronic control unit includes at least one of a sine wave attenuation portion and a sine wave amplification portion;

the sine wave attenuation portion attenuates the amplitude of the sine wave output to the electrostatic sensor for an N-period of the sine wave from the constant amplitude in the occupant determination state to zero by 1/N of the constant amplitude per one period, wherein N is a natural number; and the sine wave amplification portion amplifies the amplitude of the sine wave output to the electrostatic sensor for the N-period of the sine wave from zero to the constant amplitude in the occupant determination state by 1/N of the constant amplitude per one period.

8. The electrostatic occupant detection system according to claim 2, wherein:

the constant level of the DC voltage of the electrostatic sensor in the diagnosis state is different from a DC bias voltage level of the sine wave output in the occupant determination state;

the electronic control unit includes at least one of a diagnosis state transition portion and an occupant determination state transition portion;

the diagnosis state transition portion includes a sine wave attenuation portion and a first direct-current shift control portion;

the sine wave attenuation portion attenuates the amplitude of the sine wave output to the electrostatic sensor for an N-period of the sine wave from the constant amplitude in the occupant determination state to zero by 1/N of the constant amplitude per one period, and N is a natural number;

the first direct-current shift control portion decreases or increases the voltage output to the electrostatic sensor to the constant level of the DC voltage in the diagnosis state by a slew rate control after the sine wave attenuation portion attenuates the amplitude to zero;

the occupant determination state transition portion includes a sine wave amplification portion and a second direct-current shift control portion;

the second direct-current shift control portion decreases or increases the voltage output to the electrostatic sensor to the DC bias voltage level of the sine wave in the occupant determination state by a slew rate control while maintaining the amplitude zero; and the sine wave amplification portion amplifies the amplitude of the sine wave output to the electrostatic sensor for the N-period of the sine wave from zero to the constant amplitude in the occupant determination state by 1/N of the constant amplitude per one period while maintaining the voltage decreased or increased by the second direct-current shift control portion.

9. An electrostatic occupant detection system, comprising:
an electrostatic sensor including an electrode disposed in a vehicle seat; and
an electronic control unit ECU configured to output a sine wave to the electrostatic sensor to have the electrode generate an electric field, the electronic control unit including a current detection resistor connected to the electrostatic sensor, the electronic control unit detecting an electric current or a voltage at the current detection resistor which changes in accordance with the electric field, the electronic control unit determining the presence of an occupant based on the electric current or the voltage, wherein
the ECU is switchable between an occupant determination state in which the ECU outputs a sine wave having a constant amplitude and a diagnosis state in which the ECU maintains a direct current DC voltage of the electrostatic sensor at a constant level, and the ECU gradually changes at least one of an amplitude and a frequency of the sine wave when the ECU switches from the occupant determination state to the diagnosis state or when the ECU switches from the diagnosis state to the occupant determination state, wherein the constant level of the DC voltage of the electrostatic sensor in the diagnosis state is lower than the DC bias voltage level of the sine wave output in the occupant determination state;

the ECU includes at least one of a sine wave attenuation portion and a sine wave amplification portion;

the sine wave attenuation portion attenuates the amplitude of the sine wave while decreasing the DC bias voltage level of the sine wave by multiplying the sine wave that has the constant amplitude and is output in the occupant determination state by a first output signal that linearly decreases from the DC bias voltage level of the sine wave in the occupant determination state to the constant level of the DC voltage level in the diagnosis state; and the sine wave amplification portion amplifies the amplitude of the sine wave while increasing the DC bias voltage level of the sine wave by multiplying the sine wave that has the constant amplitude and is output in the occupant determination state by a second output signal that linearly increases from the constant level of the DC voltage level in the diagnosis state to the DC bias voltage level of the sine wave in the occupant determination state.

10. An electrostatic occupant detection system, comprising:
an electrostatic sensor including an electrode disposed in a vehicle seat; and
an electronic control unit ECU configured to output a sine wave to the electrostatic sensor to have the electrode generate an electric field, the electronic control unit including a current detection resistor connected to the electrostatic sensor, the electronic control unit detecting an electric current or a voltage at the current detection resistor which changes in accordance with the electric field, the electronic control unit determining the presence of an occupant based on the electric current or the voltage, wherein
the ECU is switchable between an occupant determination state in which the ECU outputs a sine wave having a constant amplitude and a diagnosis state in which the ECU maintains a direct current (DC) voltage of the electrostatic sensor at a constant level, and the ECU gradually changes at least one of an amplitude and a frequency of the sine wave when the ECU switches from the occupant determination state to the diagnosis state or when the ECU switches from the diagnosis state to the occupant determination state, and wherein the constant level of the DC voltage of the electrostatic sensor in the diagnosis state is different from a DC bias voltage level of the sine wave output in the occupant determination state;

the ECU includes at least one of a diagnosis state transition portion and an occupant determination state transition portion, wherein the diagnosis state transition portion includes a sine wave attenuation portion that attenuates the amplitude of the sine wave output to the electrostatic sensor for a N-period of the sine wave from the constant amplitude in the occupant determination state to zero by 1/N of the constant amplitude per one period, and a first direct-current shift control portion that decreases or increases the voltage output to the electrostatic sensor to the constant level of the DC voltage in the diagnosis state with a slew rate control after the sine wave attenuation portion attenuates the amplitude to zero, and N is a natural number;

wherein the occupant determination state transition portion includes a sine wave amplification portion and a second direct-current shift control portion, wherein the second direct-current shift control portion decreases or increases the voltage output to the electrostatic sensor to the DC bias voltage level of the sine wave in the occupant determination state by a slew rate control while maintaining the amplitude zero; and the sine wave amplification portion amplifies the amplitude of the sine wave output to the electrostatic sensor for the N-period of the sine wave from zero to the constant amplitude in the occupant determination state by 1/N of the constant amplitude per one period while maintaining the voltage decreased or increased by the second direct-current shift control portion.

\* \* \* \* \*